United States Patent
Liu et al.

(10) Patent No.: US 11,126,032 B2
(45) Date of Patent: Sep. 21, 2021

(54) DISPLAY PANEL, CONTROL METHOD THEREOF AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Fangzhuan Liu, Beijing (CN); Jingyong Hu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/652,078

(22) PCT Filed: May 16, 2019

(86) PCT No.: PCT/CN2019/087141
§ 371 (c)(1),
(2) Date: Mar. 30, 2020

(87) PCT Pub. No.: WO2019/223590
PCT Pub. Date: Nov. 28, 2019

(65) Prior Publication Data
US 2020/0264462 A1    Aug. 20, 2020

(30) Foreign Application Priority Data

May 24, 2018    (CN) .......................... 201810506959.0

(51) Int. Cl.
*G02F 1/13357*  (2006.01)
*H05B 47/20*    (2020.01)
(Continued)

(52) U.S. Cl.
CPC ...... *G02F 1/1336* (2013.01); *G02F 1/133308* (2013.01); *H05B 47/11* (2020.01); *H05B 47/20* (2020.01)

(58) Field of Classification Search
CPC ............. G02F 1/1336; G02F 1/133308; G02F 1/133317; G02F 1/133322; G02F 1/133555; H05B 47/11; H05B 47/20
See application file for complete search history.

(56) References Cited

U.S. PATENT DOCUMENTS 6,330,047 B1*  12/2001  Kubo ................ G02F 1/133555
                                                       349/147
9,442,529 B2*  9/2016   Huang ................ G06F 1/1652
(Continued)

FOREIGN PATENT DOCUMENTS

CN    2715438    8/2005
CN    1933494    3/2007
(Continued)

OTHER PUBLICATIONS

International Search Report from PCT/CN2019/087141 dated Jul. 26, 2019.
(Continued)

*Primary Examiner* — Amy Cohen Johnson
*Assistant Examiner* — Syed M Kaiser
(74) *Attorney, Agent, or Firm* — Calfee, Halter & Griswold LLP

(57) ABSTRACT

A display panel, a control method thereof, and a display device are disclosed. The display panel includes a display module and a backlight module, and the display module and
(Continued)

the backlight module are relatively movably connected with each other through a connection component so that the backlight module is switchable between a first state and a second state. In the first state, the backlight module is blocked by the display module, and in the second state, the backlight module is exposed.

16 Claims, 3 Drawing Sheets

(51) Int. Cl.
*H05B 47/11* (2020.01)
*G02F 1/1333* (2006.01)

(56) References Cited

U.S. PATENT DOCUMENTS

| | | | | |
|---|---|---|---|---|
| 9,678,539 | B2* | 6/2017 | Hayk | G06F 1/1652 |
| 2002/0005819 | A1* | 1/2002 | Ronzani | G02B 27/0176 |
| | | | | 345/8 |
| 2004/0119676 | A1* | 6/2004 | Nam | G09G 3/3648 |
| | | | | 345/87 |
| 2005/0176470 | A1* | 8/2005 | Yamakawa | G09G 3/001 |
| | | | | 455/566 |
| 2006/0044240 | A1* | 3/2006 | Takizawa | G02F 1/133514 |
| | | | | 345/88 |
| 2006/0125774 | A1* | 6/2006 | Nishigaki | G09G 3/342 |
| | | | | 345/102 |
| 2008/0144265 | A1* | 6/2008 | Aoki | H04M 1/0268 |
| | | | | 361/679.04 |
| 2008/0284929 | A1* | 11/2008 | Kimura | G02F 1/136286 |
| | | | | 349/38 |
| 2009/0051830 | A1* | 2/2009 | Matsushita | G06F 1/1647 |
| | | | | 348/836 |
| 2009/0315867 | A1* | 12/2009 | Sakamoto | G06F 3/03547 |
| | | | | 345/184 |
| 2010/0171729 | A1* | 7/2010 | Chun | G02F 1/13338 |
| | | | | 345/211 |
| 2012/0105491 | A1 | 5/2012 | Hou et al. | |
| 2012/0169765 | A1* | 7/2012 | Xu | G06F 3/1431 |
| | | | | 345/619 |
| 2012/0243207 | A1* | 9/2012 | Wang | G09F 9/30 |
| | | | | 362/97.1 |
| 2013/0053100 | A1* | 2/2013 | Song | G09G 3/003 |
| | | | | 455/556.1 |
| 2013/0222730 | A1* | 8/2013 | Choi | G02F 1/133371 |
| | | | | 349/61 |
| 2014/0043446 | A1* | 2/2014 | Xu | G02B 30/24 |
| | | | | 348/51 |
| 2015/0179119 | A1* | 6/2015 | Wakimoto | G02F 1/13306 |
| | | | | 345/212 |
| 2017/0365234 | A1* | 12/2017 | Yamazaki | G09G 5/10 |
| 2019/0041697 | A1* | 2/2019 | Yan | G02F 1/1336 |
| 2019/0156766 | A1* | 5/2019 | Lin | G09G 3/3406 |
| 2020/0133037 | A1* | 4/2020 | Li | G09G 3/36 |
| 2020/0264462 | A1 | 8/2020 | Liu et al. | |
| 2020/0357334 | A1* | 11/2020 | Li | G06F 3/041 |
| 2020/0363676 | A1* | 11/2020 | Eguchi | G09F 9/30 |

FOREIGN PATENT DOCUMENTS

| | | |
|---|---|---|
| CN | 103973856 | 8/2014 |
| CN | 104200782 | 12/2014 |
| CN | 206210285 | 5/2017 |
| CN | 107085344 | 8/2017 |
| CN | 107644597 | 1/2018 |
| CN | 108761877 | 11/2018 |

OTHER PUBLICATIONS

Office action from Chinese Application No. 201810506959.0 dated Mar. 24, 2020.

* cited by examiner

DISPLAY PANEL, CONTROL METHOD THEREOF AND DISPLAY DEVICE

CROSS REFERENCE TO RELATED APPLICATIONS

The present application is a 35 U.S.C. 371 national stage application of PCT International Application No. PCT/CN2019/087141, filed on May 16, 2019, which claims the benefit of Chinese Patent Application No. 201810506959.0, filed on May 24, 2018, the entire disclosures of which are incorporated herein by reference.

TECHNICAL FIELD

The present disclosure relates to the fields of display technology and illumination technology, and more particularly, to a display panel, a control method thereof, and a display device.

BACKGROUND

At present, the field of display technology is separate from the field of illumination technology. For example, a household illumination device and a display device are two types of products independent of each other, each of which has only a single function. For example, a display device such as television is generally used only for a display function and cannot implement an illumination function. However, in fact, there is an inextricable connection between display technology and illumination technology. For example, the backlight source of a liquid crystal display (LCD) can not only be used to provide a backlight for the display to achieve the display function, but also can be used as a good uniform surface light source for illumination. Therefore, the utilization of backlight source in various display devices is currently not high. Further, when the brightness of the backlight of the television drops below 50% and thus the desired display effect cannot be achieved, the television as a whole will have to be eliminated in spite of other components in the television being probably able to operate normally, since the backlight source is usually integrated with other components in the television of which any component is not easy to replace separately.

SUMMARY

In view of the problems in the related art, there is proposed in the present disclosure a display panel, a control method thereof, and a display device.

According to a first exemplary embodiment of the present disclosure, a display panel including a display module and a backlight module is provided. The display module and the backlight module are relatively movably connected with each other through a connection component so that the backlight module is switchable between a first state and a second state. In the first state, the backlight module is blocked by the display module, and in the second state, the backlight module is exposed.

In some embodiments of the display panel according to the present disclosure, the connection component includes a sliding mechanism or a flipping mechanism between an edge of the display module and an edge of the backlight module.

In some embodiments of the display panel according to the present disclosure, the sliding mechanism includes a first slider and a second slider arranged in parallel with each other.

In some embodiments of the display panel according to the present disclosure, each of the first slider and the second slider includes a slide rail and a slide base slidably connected with respect to each other, and one of the slide rail and the slide base is fixedly connected to the display module and the other of the slide rail and the slide base is fixedly connected to the backlight module.

In some embodiments of the display panel according to the present disclosure, each of the first slider and the second slider includes at least one of a ball-bearing slider and a roller-mounted slider.

In some embodiments of the display panel according to the present disclosure, the flipping mechanism includes a support shaft and a shaft sleeve rotatably connected with respect to each other, and one of the support shaft and the shaft sleeve is fixedly connected to the display module and the other of the support shaft and the shaft sleeve is fixedly connected to the backlight module.

In some embodiments of the display panel according to the present disclosure, the display panel further includes a light leakage-proof component at an edge of at least one of the backlight module and the display module.

In some embodiments of the display panel according to the present disclosure, the backlight module and the display module are configured to be detachably connected to each other.

In some embodiments of the display panel according to the present disclosure, the display panel further includes: a driving component configured to drive the connection component to enable the backlight module and the display module to move relative to each other; and a control component configured to receive a control signal and control at least one of the driving component, the backlight module, and the display module according to the control signal.

In some embodiments of the display panel according to the present disclosure, the control signal includes a first control signal and a second control signal. The control component is further configured to control the driving component to put the backlight module in the first state in response to the first control signal, and control the driving component to put the backlight module in the second state in response to the second control signal.

In some embodiments of the display panel according to the present disclosure, the display panel further includes a monitoring component configured to monitor at least one of a brightness of backlight emitted by the backlight module and a brightness of ambient light.

In some embodiments of the display panel according to the present disclosure, the monitoring component includes a plurality of first brightness sensors at corners of a light exiting surface of the backlight module respectively, and each of the plurality of first brightness sensors is configured to sense the brightness of backlight emitted by the backlight module. The control component is further configured to: compare a plurality of backlight brightnesses sensed by the plurality of first brightness sensors with a brightness threshold respectively in response to the backlight module being in the first state; control the display module to display a prompt message for replacing the backlight module in response to at least two of the plurality of backlight brightnesses being less than the brightness threshold; and control the display module to perform backlight compensation in response to only one of the plurality of backlight brightnesses being less than the brightness threshold.

In some embodiments of the display panel according to the present disclosure, the monitoring component includes a second brightness sensor, on a non-light exiting surface of the backlight module, configured to sense the brightness of ambient light. The control component is further configured to adjust the brightness of backlight emitted by the backlight module according to the brightness of ambient light in response to the backlight module being in the second state.

According to another exemplary embodiment of the present disclosure, a display device including the display panel according to some embodiments of the disclosure is provided.

According to still another exemplary embodiment of the present disclosure, a control method for the display panel according to some embodiments of the disclosure is provided, the control method includes the following steps: receiving a control signal; controlling the connection component according to the control signal so that the backlight module is switchable between a first state and a second state.

In some embodiments of the control method according to the present disclosure, the control signal includes a first control signal and a second control signal, and the step of controlling the connection component according to the control signal so that the backlight module is switchable between a first state and a second state includes: controlling the connection component to put the backlight module in the first state in response to the first control signal; and controlling the connection component to put the backlight module in the second state in response to the second control signal.

In some embodiments of the control method according to the present disclosure, the control method further includes the following steps: sensing a plurality of brightnesses of backlight emitted by the backlight module at a plurality of corners of a light exiting surface of the backlight module respectively in response to the backlight module being in the first state; comparing the plurality of backlight brightnesses sensed at the plurality of corners with a brightness threshold respectively; controlling the display module to display a prompt message for replacing the backlight module in response to at least two of the plurality of backlight brightnesses being less than the brightness threshold; and controlling the display module to perform backlight compensation in response to only one of the plurality of backlight brightnesses being less than the brightness threshold.

In some embodiments of the control method according to the present disclosure, the control method further includes the following steps: sensing a brightness of ambient light in response to the backlight module being in the second state; and adjusting the brightness of the backlight emitted by the backlight module according to the brightness of ambient light.

According to yet another exemplary embodiment of the present disclosure, there is provided a computer-readable storage medium having stored thereon a computer program that, when executed, performs the control method for the display panel according to some embodiments of the present disclosure.

BRIEF DESCRIPTION OF THE DRAWINGS

In order to explain the technical solutions in the embodiments of the present disclosure more clearly, the drawings used in the description of the embodiments will be briefly introduced below. Obviously, the drawings in the following description are only some embodiments of the present disclosure, for those skilled in the art, other drawings can be obtained based on these drawings without paying creative work.

DETAILED DESCRIPTION OF THE DISCLOSURE

In order to enable those skilled in the art to better understand the present disclosure, the technical solutions in the embodiments of the present disclosure will be clearly and completely described below with reference to the accompanying drawings in the embodiments of the present disclosure.

In some of the processes described in the description, claims and the above-mentioned drawings of the present disclosure, there are a plurality of operations appearing in a specific order, but it should be clearly understood that these operations may not be performed in the order in which they appear or may be performed parallel. The sequence numbers of operations such as 101 and 102 are only used to distinguish different operations. The sequence numbers themselves do not represent any order of performing. In addition, these processes may include more or fewer operations, and these operations may be performed sequentially or in parallel.

Figure 1:
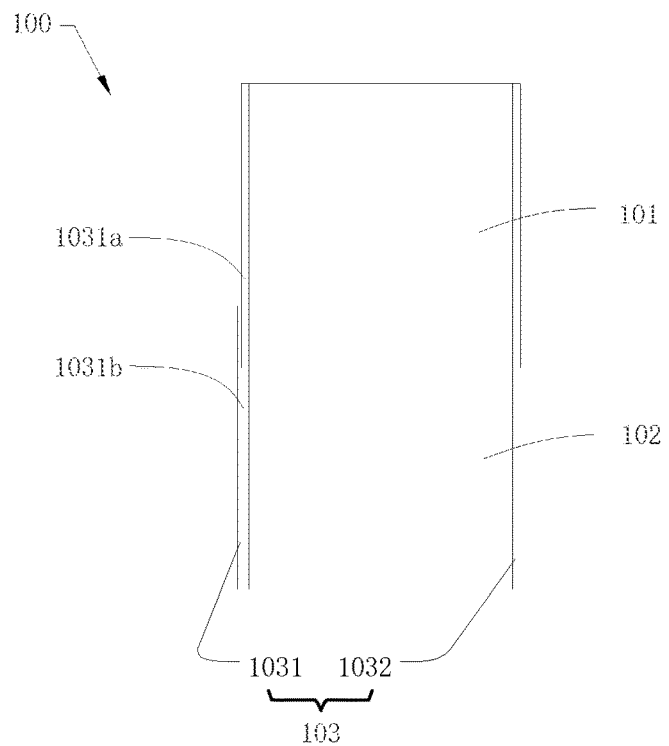
FIG. 1 schematically illustrates a front view of a structure of a display panel according to some embodiments of the present disclosure.
Figure 2:
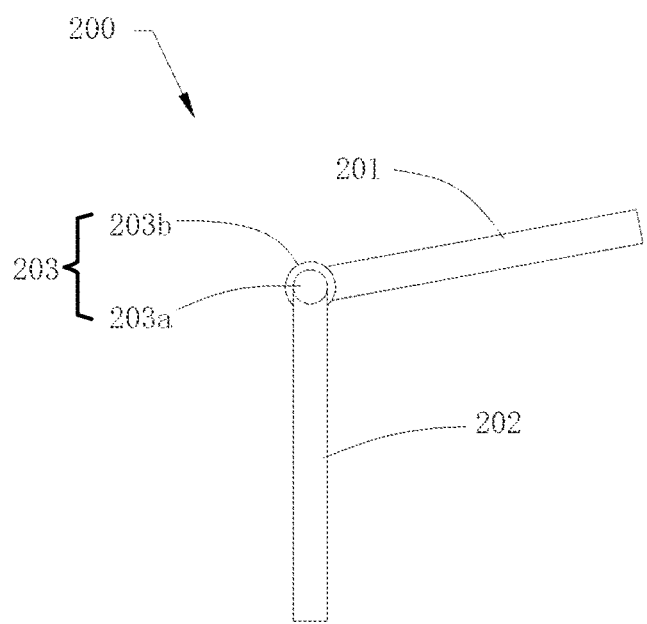
FIG. 2 schematically illustrates a side view of a structure of a display panel according to other embodiments of the present disclosure.

FIGS. 1 and 2 illustrate a front view and a side view of a structure of a display panel according to some and other embodiments of the present disclosure, respectively. Referring to FIG. 1, the display panel 100, 200 includes a display module 101, 201 and a backlight module 102, 202. The display module 101, 201 and the backlight module 102, 202 are relatively movably connected with each other through a connection component 103, 203 so that the backlight module 102, 202 is switchable between a first state and a second state. In the first state, the backlight module 102, 202 is blocked by the display module 101, 201, and in the second state, the backlight module 102, 202 is exposed.

As described above, the first state of the backlight module 102, 202 refers to a state where the backlight module 102, 202 is blocked by the display module 101, 201 (not shown in the figures); as shown in FIGS. 1 and 2, the second state of the backlight module 102, 202 refers to a state where the display module 101, 201 is relatively displaced from the backlight module 102, 202 so that the backlight module 102, 202 is exposed.

In the display panel according to some embodiments of the present disclosure, by introducing a connection component (for example, a sliding mechanism 103 shown in FIG. 1 and a flipping mechanism 203 shown in FIG. 2) between the display module 101, 201 and the backlight module 102, 202, both the backlight module and the display module can move relative to each other to form a mutual dislocation, thereby exposing the backlight module behind the display module. In this case, the backlight module can realize an illumination function by virtue of its characteristic to be a uniform surface light source. In this way, the display panel according to the present disclosure realizes a free displacement and reposition between the backlight module and the display module by using a relatively movable connection manner between the display module and the backlight module, so that the display panel can be used as an illumination device in addition to the traditional display function. Compared with the related art, such a multifunctional display panel of the present disclosure can make full use of illumination function of the backlight module so as to avoid idleness and waste of resources and avoid separate purchase of a display device and an illumination device, which saves cost and space for user.

In some embodiments according to the present disclosure, as shown in FIGS. 1 and 2, the connection component 103, 203 may be disposed between the edge of the display module 101, 201 and the edge of the backlight module 102, 202 to avoid blocking the backlight emitted from the backlight module 102, 202 to the display module 101, 201 and thus avoid affecting the display function of the display panels 100, 200. In an exemplary embodiment, the connection component 103, 203 may be a sliding mechanism 103 (FIG. 1) or a flipping mechanism 203 (FIG. 2). In other words, the relative movement between the display module 101, 201 and the backlight module 102, 202 can be realized by sliding or rotating.

Generally, for a rectangular display panel 100, 200 the above-mentioned "edge" can include an upper edge, a lower edge, a left edge, and a right edge. FIG. 1 illustrates a case where the sliding mechanism 103 is disposed on the left and right edges of the display module 101 and the backlight module 102. In this case, relative upward and downward sliding between the display module 101 and the backlight module 102 can be realized to form a displacement or mutual dislocation; and FIG. 2 illustrates a case where the flipping mechanism 203 is disposed between the upper or top edges of the display module 201 and the backlight module 202. In this case, the relative upward and downward rotation between the display module 201 and the backlight module 202 can also be achieved to form a displacement. Similarly, although not shown in the figures, the sliding mechanism 103 in FIG. 1 can also be disposed at the upper and lower (or top and bottom) edges to achieve relative left and right sliding between the display module 101 and the backlight module 102 to form a displacement, and the flipping mechanism 203 in FIG. 2 can also be disposed at the bottom edge, the left and right edges, so as to realize the relative left and right rotation between the display module 201 and the backlight module 202 to from a displacement.

As shown in FIG. 1, in some embodiments according to the present disclosure, the sliding mechanism 103 may include a first slider 1031 and a second slider 1032 disposed parallel to each other between the left edges and right edges of the backlight module 102 and the display module 101 respectively. Such a dual-slider arrangement can ensure smoothness and stabilization of the relative sliding between the backlight module 102 and the display module 101. In addition, as described above, the first slider 1031 and the second slider 1032 may be disposed between the upper edges and lower edges of the backlight module 102 and the display module 101, respectively. In addition, in some embodiments, the first slider 1031 and the second slider 1032 may be a ball-bearing slider or a roller-mounted slider.

In some embodiments according to the present disclosure, as shown in FIG. 1, the first slider 1031 in the sliding mechanism 103 may include a slide rail 1031a and a slide base 1031b that are slidably connected with respect to each other, where the slide rail 1031a is fixedly connected to the display module 101, and the slide base 1031b is fixedly connected to the backlight module 102. It should be noted that, the slide rail 1031a may also be fixedly connected to the backlight module 102 and the slide base 1031b may be fixedly connected to the display module 101, although it is not shown in the figures. Similarly, the second slider 1032 may also include a slide rail and a slide base, one of which is fixedly connected to the display module 101 and the other is fixedly connected to the backlight module 102, so as to achieve the relative sliding between the display module 101 and the backlight module 102.

In some embodiments according to the present disclosure, as shown in FIG. 2, the flipping mechanism 203 includes a support shaft 203a and a shaft sleeve 203b rotatably connected with respect to each other. The support shaft 203a is fixedly connected to the backlight module 202 and the shaft sleeve 203b is fixedly connected to the display module 201, so that the display module 201 can be flipped relative to the backlight module 202 around the support shaft 203a. As a result, the display module 201 and the backlight module 202 are mutually displaced to expose the backlight module 202. In addition, in some embodiments, the support shaft 203a and the shaft sleeve 203b may be fixedly connected to the display module 201 and the backlight module 202, respectively, so that the backlight module 202 can be flipped relative to the display module 201 around the support shaft 203a, which can result in that the display module 201 and the backlight module 202 are displaced to expose the backlight module 202.

In the display panels 100 and 200 according to some embodiments of the present disclosure, the backlight module 102, 202 and the display module 101, 201 may be configured to be detachably connected to each other. This detachable connection facilitates the separate replacement of the backlight module 102, 202 and the display module 101, 201. For example, when only one of the backlight module 102, 202 and the display module 101, 201 is damaged or aged, the damaged module can be easily replaced individually without having to replace the entire display panel 100, 200, thereby simplifying the replacement process, improving work efficiency and component utilization, and avoiding waste of resources. Further, the replaced backlight module 102 and 202 may not be able to meet the display requirements only due to the reduced brightness, but are not completely damaged. Therefore, it can also be used for secondary uses, such as illumination in bathrooms, corridors, etc., which can further improve recycling utilization.

In some embodiments, the display panel 100 may further include a light leakage-proof component (not shown) for preventing light leakage from a gap between the backlight module 102 and the display module 101. The light leakage-proof component may be disposed on an edge of at least one of the backlight module 102 and the display module 101. Due to the special relatively movable connection component 103 between the display module 101 and the backlight module 102, there may be a gap between the display module 101 and the backlight module 102. The light leakage-proof component can effectively prevent light leakage to improve display effect.

In an exemplary embodiment, the light leakage-proof component of the display panel 100 may include a frame (not shown) extending along edges of the backlight module 102 and the display module 101 other than the edges where the connection component is located. The frame and the connection component 103 (e.g., the first slider and the second slider) collectively surround the periphery of the backlight module 102 and the display module 101 to prevent light leakage from the gap between the backlight module 102 and the display module 101. For example, when the connecting component 103 includes the first and second sliders 1031 and 1032 as shown in FIG. 1 and each slider includes a slide rail 1031a and a slide base 103b, the light leakage-proof component includes two frames, one of which can be fixedly connected to a first groove (not shown) of the display module 101 for receiving the edge of the backlight module 102, and the other can be fixedly connected to a second groove of the backlight module 102 for receiving the edge of the display module 101. It can be understood that when the display module 101 and the backlight module 102 are not mutually dislocated, one edge of the backlight module 102 is received in the first groove, and the other edges are surrounded by the frame and the slide rail 1031a to which the backlight module 102 is fixedly connected; and one edge of the display module 101 is received in the second groove, and the other edges are also surrounded by the frame and the slide rail 1031a to which the display module 101 is fixedly connected. When the display module 101 and the backlight module 102 are relatively displaced with respect to each other, the frame fixedly connected to the slidable display module 101 and/or the backlight module 102 can slide with the display module 101 and/or the backlight module 102.

In the embodiment shown in FIG. 1, the slide base 1031b is arranged on the left and right sides of the backlight module 102, and the slide rail 1031a is slidably embedded in the slide base 1031b and is fixedly connected to the display module 101. When only the slide rail 1031a can slide up and down along the slide base 103b, the frame fixedly connected to the top or bottom edge of the display module 101 can slide up and down with the display module 101, and the frame fixedly connected to the top or bottom edge of the backlight module 102 (opposite to the frame at the edge of display module 101) cannot be moved. When the slide rail 1031a and the slide base 1031b can slide up and down respectively, the two frames can slide up and down with the display module 101 and the backlight module 102, respectively.

In an exemplary embodiment, the light leakage-proof component may include a sealing strip (not shown) extending along the edge of the light incident surface of the display module 101 and a receiving groove (not shown) extending along the edge of the light exiting surface of the backlight module 102. When the backlight module 102 is in the first state or the display panel 100 is in the display mode, namely when the display module 101 and the backlight module 102 overlap without mutual dislocation, the sealing strip can be accommodated in the receiving groove to prevent the light leakage from the gap between the backlight module 102 and the display module 101.

Figure 3:
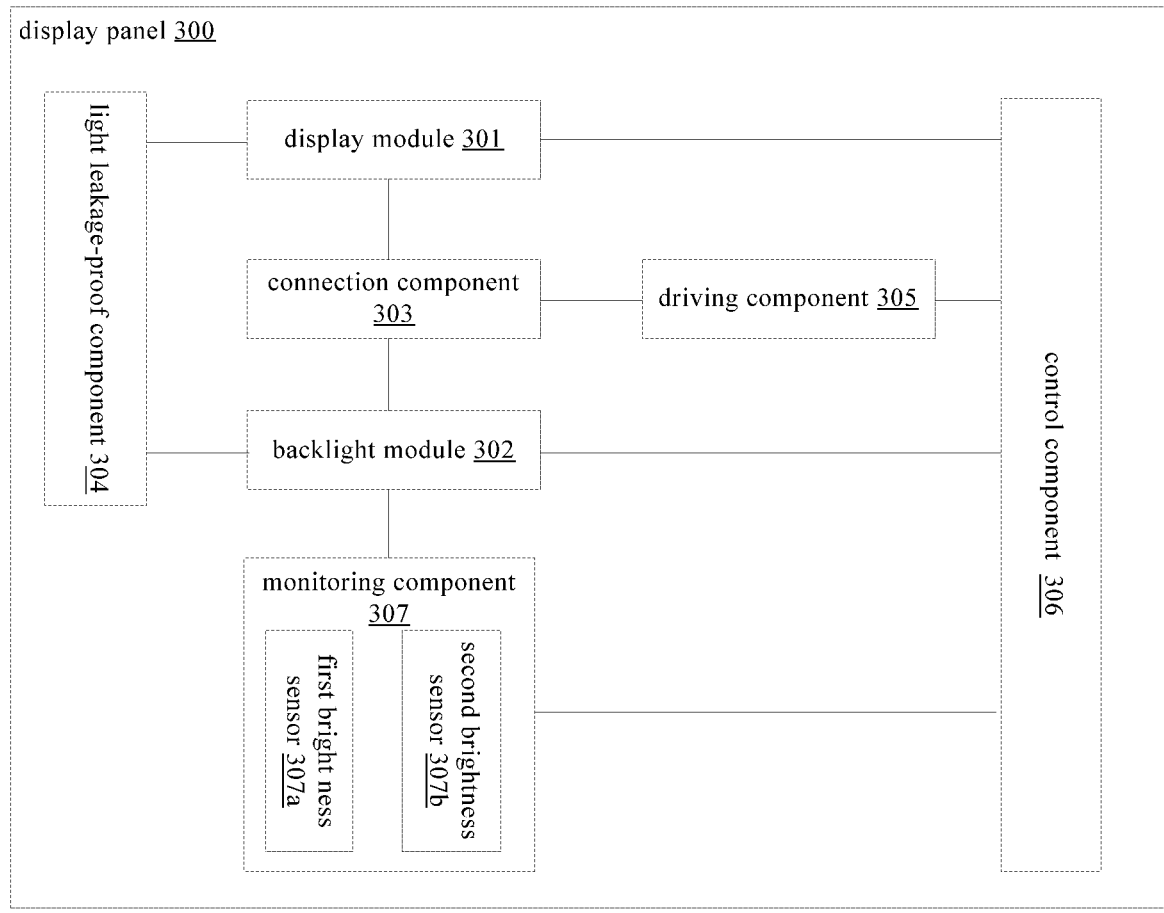
FIG. 3 schematically illustrates a structural block diagram of a display panel according to still other embodiments of the present disclosure.

FIG. 3 schematically illustrates a structural block diagram of a display panel 300 according to some embodiments of the present disclosure. As shown in FIG. 3, in addition to the display module 301, the backlight module 302, the connection component 303, and the light leakage-proof component 304, the display panel 300 may further include a driving component 305 configured to drive the connection component 303 to enable a relative movement between the backlight module 302 and the display module 301. The driving component 305 can drive the connection component 303 by a driving mode such as electric, hydraulic, pneumatic, electromagnetic driving mode, or the like. Therefore, the driving component 305 may be a driving circuit or other types of driving devices depending on the driving mode. In addition, the driving component 305 may be disposed in the display module 301 (for example, integrated with its liquid crystal driving circuit) or the backlight module 302. Of course, the driving component 305 can also be provided independently of the display module 301 and the backlight module 302. When the display panel 300 or a display device including the display panel 300 has a large area, volume, or weight (such as a panel of a current large-sized liquid crystal television), it may be rather difficult or even impossible to manually control the connection component 303 to realize sliding or flipping. The introduction of the driving component 305 can realize the automation and non-contact control of the relative movement between the backlight module 302 and the display module 301, which enhances the convenience and efficiency in product use and improves the user experience.

In some embodiments according to the present disclosure, as shown in FIG. 3, the display panel 300 may further include a control component 306 configured to receive a control signal and control at least one of the driving component 305, the backlight module 302, and the display module 301 according to the control signal. The control component 306 may be integrated in the display module 301, for example, and can be electrically connected to the backlight module 302 and the driving component 305 for controlling them. The control component 306 may have both receiving function (for example, a built-in signal receiver) and processing function for a signal. For example, the control component 306 may receive from a signal source (for example, an infrared remote control) a control signal input by a user, so as to control at least one of the driving component 305, the display module 301 and the backlight module 302 according to the control signal to automatically realize the relative movement between the backlight module 302 and the display module 301, so that the backlight module 302 can switch freely between the first state (i.e., the display mode) and the second state (i.e., the illumination mode), which improves the convenience of user operations. In addition, the control component 306 can also control other components such as the backlight module 302 or the display module 301 according to other control signals to enable corresponding operations. The control component 306 may include a central processing unit (CPU), a read-only memory (ROM) for storing programs executed by the CPU and data used in these programs, and a random access memory (RAM) for temporarily storing data used in the execution of these programs. These components work together to complete the functions of the control component. It will be understood that these functions may be implemented by software, hardware, or a combination thereof.

In some embodiments according to the present disclosure, the control signal may include a first control signal and a second control signal, which respectively correspond to the first state and the second state of the backlight module 302, namely the display mode and the illumination mode. For example, a remote controller for a display device including the display panel 300 according to the present disclosure may include two buttons, which are "display mode" and "illumination mode", respectively. A user can send the first control signal and the second control signal to the display device or the display panel by selecting these two modes. Accordingly, the control component 306 in the display panel 300 may be further configured to control the driving component 305 to put the backlight module 302 in the first state in response to the first control signal, and control the driving component 305 to put the backlight module 302 in the second state in response to the second control signal.

In some embodiments according to the present disclosure, as shown in FIG. 3, the display panel 300 may further include a monitoring component 307 configured to monitor at least one of a brightness of backlight emitted by the backlight module 302 and a brightness of ambient light. Accordingly, the control component 306 may be configured to control other components in the display panel 300 according to at least one of the monitored backlight brightness and ambient light brightness. For example, when the backlight module 302 is in the first state or the "display mode", the control component 306 can determine whether the backlight module 302 meets the display requirements based on the backlight brightness (thus determining that the backlight module 302 reaches the end of display lifetime), or when the backlight module 302 is in the second state or "illumination mode", the control component 306 can adjust the backlight brightness based on the ambient light brightness to adapt environmental change. For example, when determining whether the backlight brightness meets the actual requirements, a brightness threshold may be set in advance, and the brightness threshold may be set according to the structure and function of the display panel or the initial brightness of the backlight module, etc. Generally, the brightness threshold can be set to 50% of the original backlight brightness. In other words, when the backlight module 302 ages so that its backlight brightness decays to less than half of the initial brightness, it can be determined that the backlight module cannot meet the display requirements and thus needs to be considered for being replaced.

In some embodiments, the control component 306 may be further configured to adjust the backlight brightness according to a control signal received from a user or according to a predetermined rule in response to the backlight module 302 being in the second state. The predetermined rule may be a system default rule or a rule set and stored by a user. In an exemplary embodiment, the user may set a rule according to time. For example, the backlight brightness can be set to a first brightness from 8:00 to 17:00, a second brightness from 18:00 to 0 o'clock, and a third brightness from 0 o'clock to 8:00.

In some embodiments according to the present disclosure, as shown in FIG. 3, the monitoring component 307 may include a first brightness sensor 307a arranged on the light exiting surface of the backlight module 302 for monitoring the backlight brightness, and may also include a second brightness sensor 307b arranged on the non-light exiting surface of the backlight module 302 for monitoring ambient light brightness. The non-light exiting surface of the backlight module 302 may include a surface opposite to the light exiting surface and/or a side surface of the backlight module 302. The purpose of such arrangement is to reduce or avoid the blocking and bad influence of the first brightness sensor 307a and the second brightness sensor 307b on the backlight as much as possible.

In an exemplary embodiment, in order to more accurately measure the backlight brightness of the backlight module 302 and avoid misjudgment due to too few samples, a plurality of first brightness sensors 307a may be arranged on the light exiting surface of the backlight module 302 to sense a corresponding local backlight brightness, thereby realizing an exact judgment of the overall light emitting performance of the backlight module 302. For example, in order to avoid blocking or affecting the backlight from illuminating the display module 301, a plurality of first brightness sensors 307a may be arranged at the corners of the light exiting surface of the backlight module 302 to sense the brightness of the backlight emitted by the backlight module. Generally, the display panel 300 or the backlight module 302 therein has a rectangular shape, and thus four first brightness sensors 307a may be arranged at four (for example, upper left, upper right, lower left, and lower right) corners respectively. Of course, for the display panel 300 or the backlight module 302 with other shapes, a corresponding number of first sensors 307a may be arranged according to the specific shape of the display panel 300 or the backlight module 302.

Accordingly, when the monitoring component 307 includes a plurality of first sensors 307a, the control component 306 may be configured to: compare a plurality of backlight brightnesses sensed by the plurality of first brightness sensors with a brightness threshold respectively in response to the backlight module being in the first state; control the display module to display a prompt message for replacing the backlight module in response to at least two of the plurality of backlight brightnesses being less than the brightness threshold; and control the display module to perform backlight compensation in response to only one of the plurality of backlight brightnesses being less than the brightness threshold. As mentioned above, the brightness threshold can be set according to factors such as the original brightness of the backlight module and the overall structure and function of the display panel. For example, the brightness threshold may be set to 50% of the original brightness, e.g., 50% of the rated lumen of the backlight module 302 or other lumen values set by the user. In order to make full use of the backlight module 302 and avoid replacing the entire module due to individual local brightness attenuation, in the case where more than two of the backlight brightness values sensed by the four first brightness sensors 307a at the corners are less than the threshold (for example, 50% of the original brightness), it can be determined that the backlight module 302 cannot meet the actual requirements. As a result, it is recommended for replacement. For example, the display module 301 can be controlled to display a prompt message such as "Recommend replacement of the backlight module". When only one brightness sensing value is less than the threshold, it only indicates that the brightness of a corresponding part cannot meet the display requirements (the brightness of other parts is normal). In this case, it can be considered that the display module 301 can still be used as a whole. In other words, it may not be recommended to replace the entire backlight module 302 temporarily, but it is necessary to properly treat the lower brightness parts to meet the display requirements. In an exemplary embodiment, a part of the display module 301 illuminated by a backlight with a lower brightness may be passed through by more backlight to perform a backlight compensation by modulating the deflection angle of the liquid crystal molecules in the display module 301.

In some embodiments, in order to achieve the detachable connection in the display panel 300, the connection between the display module 301, the backlight module 302, the driving component 305, the control component 306, and the monitoring component 307 in the display panel 300 may be implemented by means of wiring or direct card-slot contact, such as any one of gold finger, magnetic-suction joint or other contact-type joint.

The present disclosure also provides a display device including the display panel according to some embodiments of the present disclosure.

Figure 4:
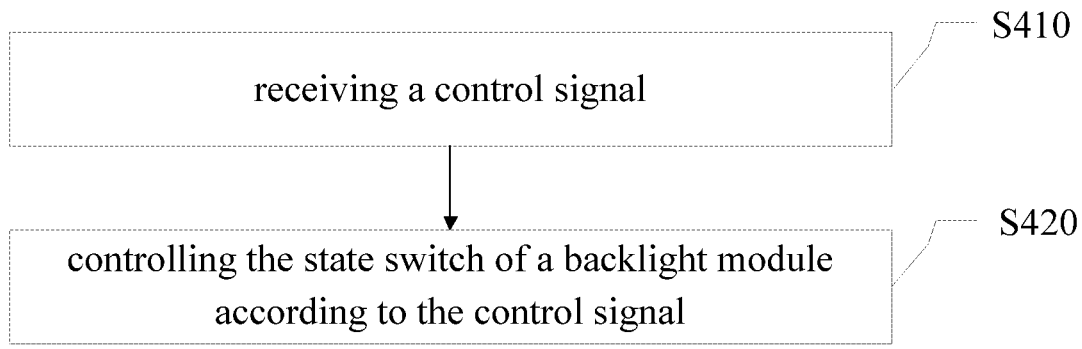
FIG. 4 schematically illustrates a flowchart of a control method for a display panel according to some embodiments of the present disclosure.

FIG. 4 schematically illustrates a flowchart of a control method for a display panel according to some embodiments of the present disclosure. As shown in FIG. 4, a control method for a display panel according to some embodiments of the present disclosure includes the following steps:

S410, receiving a control signal; and

S420, controlling the connection component according to the control signal so that the backlight module is switchable between the first state and the second state.

In the control method for a display panel shown in FIG. 4, the control signal may be a signal sent to a display panel or a display device (such as a television) including a display panel by a user using a signal source such as a remote controller, for example, an infrared signal. After receiving the control signal, the display panel can control the relative movement between the backlight module and the display module according to the control signal, so that the backlight module can be switched between the first state (i.e., the display mode) and the second state (i.e., the illumination mode). In this way, the automatic selection and switch of the display function and illumination function of the backlight module according to a user control command are achieved. Reference to the above description of a display panel according to some embodiments of the present disclosure can be made for detailed implementations.

Figure 5:
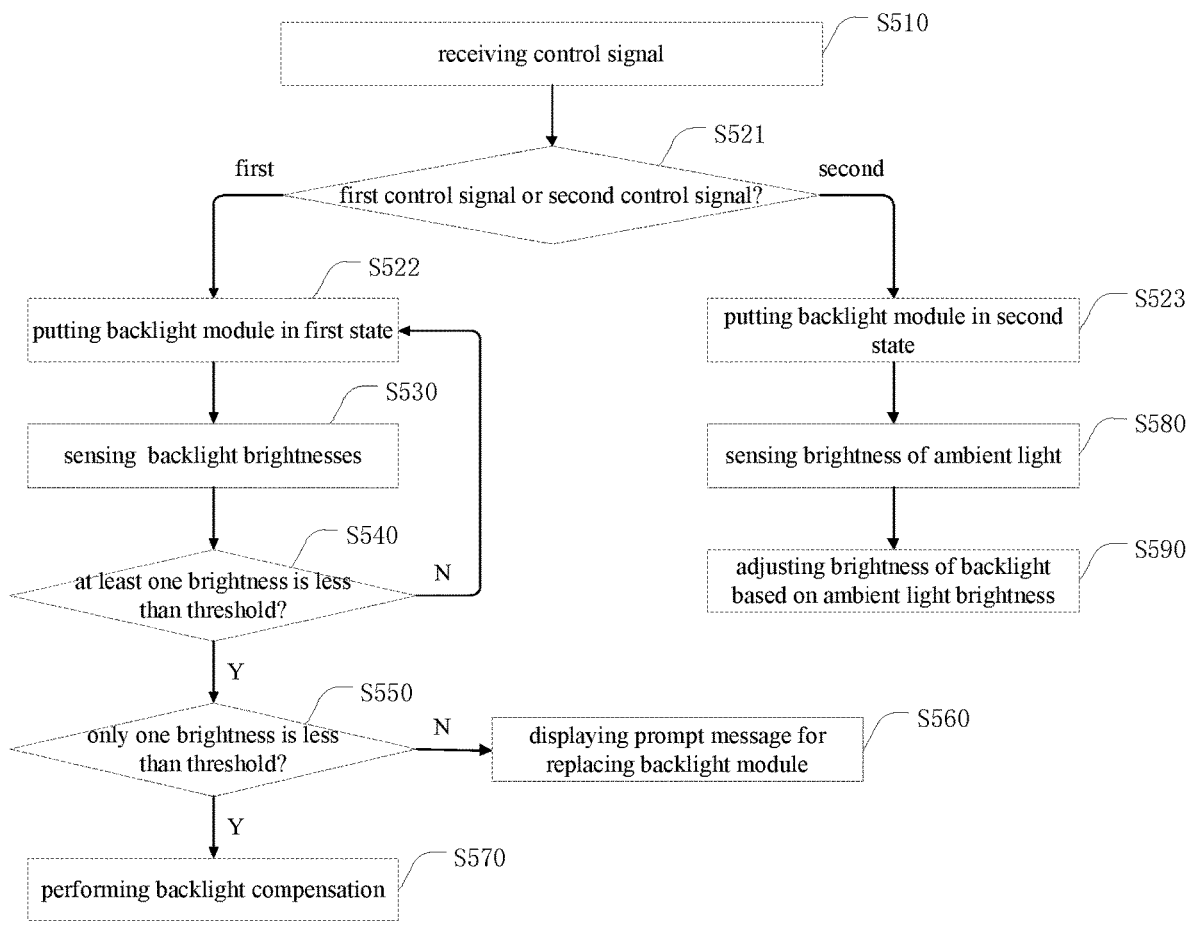
FIG. 5 schematically illustrates a flowchart of a control method for a display panel according to other embodiments of the present disclosure.

FIG. 5 schematically illustrates a flowchart of a control method for a display panel according to other embodiments of the present disclosure. The control signal in step S420 shown in FIG. 4 may include a first control signal and a second control signal, which respectively correspond to the first state and the second state of the backlight module, for example. Therefore, in the control method shown in FIG. 5, step S510 is the same as S410 in FIG. 4, and the step S420 of controlling the connection component according to the control signal so that the backlight module is switchable between the first state and the second state in FIG. 4 includes:

S521, determining whether the received control signal is the first control signal or the second control signal;

S522, controlling the connection component to put the backlight module in the first state in response to the first control signal; and S523, controlling the connection component to put the backlight module in the second state in response to the second control signal.

In some embodiments according to the present disclosure, as shown in FIG. 5, the control method for a display panel shown in FIG. 5 further includes the following steps:

S530, sensing a plurality of brightnesses of backlight emitted by the backlight module at a plurality of corners of a light-exiting surface of the backlight module respectively in response to the backlight module being in the first state;

S540, comparing the plurality of backlight brightnesses sensed at the plurality of corners with a brightness threshold respectively to determine whether there is at least one of the plurality of backlight brightnesses is less than the brightness threshold, and if no, returning to step S530, otherwise going to S550;

S550, in response to at least one of the plurality of backlight brightnesses being less than the brightness threshold, determining whether only one of the plurality of backlight brightnesses is less than the brightness threshold;

S560, controlling the display module to display a prompt message for replacing the backlight module in response to at least two of the plurality of backlight brightnesses being less than the brightness threshold; and S570, controlling the display module to perform backlight compensation in response to only one of the plurality of backlight brightnesses being less than the brightness threshold.

In some embodiments according to the present disclosure, as shown in FIG. 5, the control method for a display panel shown in FIG. 5 may further include the following steps:

S580, sensing a brightness of ambient light in response to the backlight module being in the second state; and S590, adjusting the brightness of the backlight according to the brightness of ambient light.

It should be noted that, for the specific implementation processes of the above control methods for a display panel according to some embodiments of the present disclosure shown in FIGS. 4 and 5, reference may be made to the detailed description of the display panel according to some embodiments of the present disclosure above.

Accordingly, the present disclosure also provides a computer-readable storage medium having stored thereon a computer program that, when executed, performs the control method for a display panel according to some embodiments of the present disclosure.

Those skilled in the art can understand that computer program instructions can be used to implement each block in these structural diagrams and/or block diagrams and/or flow diagrams and a combination of blocks in these structural diagrams and/or block diagrams and/or flow diagrams. Those skilled in the art can understand that these computer program instructions may be provided to a processor of a general-purpose computer, a professional computer, or other programmable data processing methods, so that the scheme specified in the block or blocks of the structural diagrams and/or block diagrams and/or flow diagrams disclosed in this disclosure may be executed by the processor of a computer or other programmable data processing methods.

In the description of the present disclosure, it should be noted that the orientational or positional relationships indicated by the terms "on" and "below" are based on the orientational or positional relationships shown in the drawings, and are only for the convenience of describing the present disclosure and simplifying the description, instead of indicating or implying that a device or element referred to must have a particular orientation, be constructed and operated in a particular orientation, and hence should not be construed as limiting the present disclosure. Unless otherwise clearly specified and limited, the terms such as "installation", "connection", and "connected" should be understood in a broad sense, for example, it may be a fixed connection, a detachable connection, or an integral connection; it may be a mechanical connection or an electrical connection; it may be directly connected or indirectly connected through an intermediate medium, or it can be the internal connection of two elements. For those of ordinary skill in the art, the specific meanings of the above terms in the present disclosure can be understood according to specific situations.

It should also be noted that in the description of the present disclosure, relational terms such as first and second are used only to distinguish one entity or operation from another entity or operation, and do not necessarily require or imply that there is any such actual relationship or order between these entities or operations. Moreover, the terms "including", "comprising", or any other variants thereof are intended to encompass non-exclusive inclusion, such that a process, method, article, or device that includes a series of elements includes not only those elements but also those that are not explicitly listed, or also includes other elements inherent to such a process, method, article, or device. Without more restrictions, the elements defined by the phrase "including a . . . " do not exclude the existence of other identical elements in the process, method, article, or device including the elements.

Obviously, the above-mentioned embodiments of the present disclosure are merely examples for clearly explaining the present disclosure, and are not intended to limit the embodiments of the present disclosure. For those of ordinary skill in the art, on the basis of the above description, other different forms of changes or variations can also be made. Here, it is not possible to exhaust all implementations, and any obvious changes or variations that are derived from the technical solutions of the present disclosure are still within the protection scope of the present disclosure.

In the description of this specification, the description of the terms such as "one embodiment", "some embodiments", "examples", "specific examples", or "some examples" and the like means specific features, structures, materials, or characteristics described in conjunction with the embodiment or example are included in at least one embodiment or example of the present disclosure. In this specification, the schematic expressions of the above terms are not necessarily directed to the same embodiment or example. Moreover, the specific features, structures, materials, or characteristics described may be combined in any suitable manner in any one or more embodiments or examples. In addition, without any contradiction, those skilled in the art may combine and connect different embodiments or examples and features of different embodiments or examples described in this specification.

Any process or method description in a flowchart or otherwise described herein can be understood as representing a module, segment, or portion of a code that includes one or more executable instructions for implementing steps of a custom logic function or process, and the scope of preferred embodiments of the present disclosure includes additional implementations in which the functions may not be performed in the order shown or discussed (including in a substantially simultaneous manner or in an opposite order according to the functions involved), which should be understood by those skilled in the art to which the embodiments of the present disclosure belong.

Logic and/or steps represented in a flowchart or otherwise described herein, for example, a sequenced list of executable instructions that may be considered to implement a logical function, may be embodied in any computer-readable medium, For use by, or in combination with, an instruction execution system, a device, or an apparatus (such as a computer-based system, a system including a processor, or other systems that can fetch and execute instructions from an instruction execution system, a device, or an apparatus). For this specification, a "computer-readable medium" may be any device that can contain, store, communicate, propagate, or transmit a program for use by or in connection with an instruction execution system, a device or an apparatus. More specific examples of the computer-readable medium may, for example, include: an electrical connection (electronic device) with one or more wirings, a portable computer disk enclosure (magnetic device), random access memory, read only memory, erasable programmable read only memory or flash memory, fiber optic devices, and compact disc read only memory. In addition, the computer-readable medium may even be paper or other suitable medium on which the program can be printed, as it can be done, for example, by optically scanning the paper or other media, followed by editing, interpreting, or other suitable means if necessary to obtain the program electronically and then store it in computer memory.

It should be understood that portions of the present disclosure may be implemented in hardware, software, firmware, or a combination thereof. In the above embodiments, multiple steps or methods may be implemented by software or firmware stored in a memory and executed by a suitable instruction execution system. For example, if it is implemented in hardware, it may be implemented in any one of the following technologies or a combination thereof known in the art: a discrete logic circuit with a logic gate circuit for implementing a logic function on a data signal, an application specific integrated circuit with appropriate combined logic gate circuit, a programmable gate array, a field programmable gate array, etc.

Those of ordinary skill in the art may understand that all or part of the steps of the methods in the foregoing embodiments may be completed by a program by instructing related hardware, and the program may be stored in a computer-readable storage medium. When the program is executed, it is concerned with executing one or a combination of steps of the method embodiment.

In addition, each functional unit in each embodiment of the present disclosure may be integrated into a processing module, or each unit may exist separately physically, or two or more units may be integrated into a module. The above integrated modules may be implemented in the form of hardware or software functional modules. If the integrated module is implemented in the form of a software functional module and sold or used as an independent product, it may also be stored in a computer-readable storage medium.

The above description is only part of the embodiments of the present disclosure. It should be noted that for those of ordinary skill in the art, without departing from the principles of the present disclosure, several improvements and retouches can be made, and these improvements and retouches should be regarded as the scope of present disclosure.

The invention claimed is:

1. A display panel comprising a display module and a backlight module,
wherein the display module and the backlight module are relatively movably connected with each other through a connection component so that the backlight module is switchable between a first state and a second state, and wherein in the first state, the backlight module is blocked by the display module, and in the second state, the backlight module is exposed,
the display panel further comprising:
a driving component configured to drive the connection component to enable the backlight module and the display module to move relative to each other;
a control component configured to receive a control signal and control at least one of the driving component, the backlight module, and the display module according to the control signal; and
a monitoring component configured to monitor at least one of a brightness of a backlight emitted by the backlight module and a brightness of ambient light,
wherein the monitoring component comprises a plurality of first brightness sensors at corners of a light exiting surface of the backlight module respectively, and each of the plurality of first brightness sensors is configured to sense the brightness of the backlight emitted by the backlight module, and
wherein the control component is further configured to:
compare a plurality of backlight brightnesses sensed by the plurality of first brightness sensors with a brightness threshold respectively in response to the backlight module being in the first state;

control the display module to display a prompt message for replacing the backlight module in response to at least two of the plurality of backlight brightnesses being less than the brightness threshold; and control the display module to perform backlight compensation in response to only one of the plurality of backlight brightnesses being less than the brightness threshold.

2. The display panel according to claim 1, wherein the connection component comprises a sliding mechanism or a flipping mechanism between an edge of the display module and an edge of the backlight module.

3. The display panel according to claim 2, wherein the sliding mechanism comprises a first slider and a second slider arranged in parallel with each other.

4. The display panel according to claim 3, wherein each of the first slider and the second slider comprises a slide rail and a slide base slidably connected with respect to each other, and one of the slide rail and the slide base is fixedly connected to the display module and the other of the slide rail and the slide base is fixedly connected to the backlight module.

5. The display panel according to claim 3, wherein each of the first slider and the second slider comprises at least one of a ball-bearing slider and a roller-mounted slider.

6. The display panel according to claim 2, wherein the flipping mechanism comprises a support shaft and a shaft sleeve rotatably connected with respect to each other, and one of the support shaft and the shaft sleeve is fixedly connected to the display module and the other of the support shaft and the shaft sleeve is fixedly connected to the backlight module.

7. The display panel according to claim 2, further comprising a light leakage-proof component at the edge of at least one of the backlight module and the display module.

8. The display panel according to claim 1, wherein the backlight module and the display module are configured to be detachably connected to each other.

9. The display panel according to claim 1,
wherein the control signal comprises a first control signal and a second control signal, and the control component is further configured to control the driving component to put the backlight module in the first state in response to the first control signal and control the driving component to put the backlight module in the second state in response to the second control signal.

10. The display panel according to claim 1,
wherein the monitoring component further comprises a second brightness sensor on a non-light exiting surface of the backlight module, and the second brightness sensor is configured to sense the brightness of ambient light, and
wherein the control component is further configured to adjust the brightness of the backlight emitted by the backlight module according to the brightness of ambient light in response to the backlight module being in the second state.

11. A display device comprising the display panel according to claim 1.

12. A control method for the display panel according to claim 1, comprising following steps:
receiving a control signal;
controlling the connection component according to the control signal so that the backlight module is switchable between the first state and the second state.

13. The control method according to claim 12, wherein the control signal comprises a first control signal and a second control signal, and the step of controlling the connection component according to the control signal so that the backlight module is switchable between the first state and the second state comprises:
controlling the connection component to put the backlight module in the first state in response to the first control signal; and
controlling the connection component to put the backlight module in the second state in response to the second control signal.

14. The control method according to claim 13, further comprising following steps:
sensing a plurality of brightnesses of a backlight emitted by the backlight module at a plurality of corners of a light exiting surface of the backlight module respectively in response to the backlight module being in the first state;
comparing the plurality of backlight brightnesses sensed at the plurality of corners with a brightness threshold respectively;
controlling the display module to display a prompt message for replacing the backlight module in response to at least two of the plurality of backlight brightnesses being less than the brightness threshold; and
controlling the display module to perform backlight compensation in response to only one of the plurality of backlight brightnesses being less than the brightness threshold.

15. The control method according to claim 13, further comprising following steps:
sensing a brightness of ambient light in response to the backlight module being in the second state; and
adjusting the brightness of the backlight according to the brightness of ambient light.

16. A non-transitory computer-readable storage medium having stored thereon computer-readable instructions that, when executed, perform the control method according to claim 12.

* * * * *